US009454063B2

United States Patent
Samuels et al.

(10) Patent No.: US 9,454,063 B2
(45) Date of Patent: *Sep. 27, 2016

(54) HEAT TRANSFER CAMERA RING

(71) Applicant: GoPro, Inc., San Mateo, CA (US)

(72) Inventors: Rudy Samuels, Mill Valley, CA (US); David Christophe Northway, San Carlos, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/664,600

(22) Filed: Mar. 20, 2015

(65) Prior Publication Data
US 2015/0192840 A1 Jul. 9, 2015

Related U.S. Application Data

(63) Continuation of application No. 14/053,511, filed on Oct. 14, 2013, now Pat. No. 9,025,080.

(60) Provisional application No. 61/860,168, filed on Jul. 30, 2013, provisional application No. 61/713,814, filed on Oct. 15, 2012.

(51) Int. Cl.
*H04N 5/225* (2006.01)
*G03B 17/55* (2006.01)

(52) U.S. Cl.
CPC ............ *G03B 17/55* (2013.01); *H04N 5/2252* (2013.01); *H04N 5/2254* (2013.01); *H04N 5/2251* (2013.01)

(58) Field of Classification Search
CPC .. G03B 17/55; H04N 5/2254; H04N 5/2252; H04N 5/2251

USPC .......... 348/81, 208.99, 335, 222.1, 372–376, 348/231.7, 82, 83; 396/97, 571, 522, 572
See application file for complete search history.

(56) References Cited

U.S. PATENT DOCUMENTS

| | | | |
|---|---|---|---|
| 7,329,869 B2 * | 2/2008 | Cassel | H04N 5/33 250/339.03 |
| 8,199,251 B2 | 6/2012 | Woodman | |

(Continued)

FOREIGN PATENT DOCUMENTS

| | | |
|---|---|---|
| CN | 102692790 A | 9/2012 |
| EP | 2393277 A1 | 12/2011 |

(Continued)

OTHER PUBLICATIONS

European Extended Search Report, European Application No. 13783826.4, Oct. 23, 2014, 8 pages.

(Continued)

*Primary Examiner* — Tuan Ho
*Assistant Examiner* — Marly Camargo
(74) *Attorney, Agent, or Firm* — Fenwick & West LLP

(57) ABSTRACT

A camera system includes a camera and a camera housing structured to at least partially enclose the camera. The camera comprises an internal heat sink thermally coupled to electronics of the camera and a lens ring positioned around a lens of the camera. The camera housing comprises a thermal conductor. An interior portion of the thermal conductor makes contact with the lens ring when the camera is enclosed within the housing, and an exterior portion extends outside the housing. The thermal conductor is configured to transfer heat from the interior of the housing to the exterior to dissipate heat from the camera's electronics.

20 Claims, 10 Drawing Sheets

(56) References Cited

U.S. PATENT DOCUMENTS

| | | | | |
|---|---|---|---|---|
| 9,025,080 B2* | 5/2015 | Samuels | ............. | H04N 5/2254 348/207.99 |
| 2006/0285226 A1* | 12/2006 | Senba | ................... | G02B 7/008 359/694 |
| 2010/0060747 A1 | 3/2010 | Woodman | | |
| 2010/0067894 A1 | 3/2010 | Arbuckle et al. | | |
| 2011/0298925 A1* | 12/2011 | Inoue | .................. | H04N 5/2252 348/148 |
| 2013/0107111 A1* | 5/2013 | Campbell | ............ | H04N 5/2252 348/373 |
| 2014/0168507 A1* | 6/2014 | Renaud | ............... | H04N 5/2257 348/373 |

FOREIGN PATENT DOCUMENTS

| | | |
|---|---|---|
| JP | 2003-161994 A | 6/2003 |
| JP | 2012-047887 A | 3/2012 |

OTHER PUBLICATIONS

PCT International Search Report and Written Opinion for PCT/US2013/064884, Mar. 10, 2014, 11 pages.
Summons to attend oral proceedings pursuant to Rule 115(1) EPC, European Patent Application No. EP 13783826.4, Feb. 18, 2016, 10 pages.
First Office Action for Chinese Patent Application No. 201380001580.X, Jun. 24, 2016, 13 Pages.

* cited by examiner

HEAT TRANSFER CAMERA RING

CROSS-REFERENCE TO RELATED APPLICATIONS

This application is a continuation of U.S. patent application Ser. No. 14/053,511, filed Oct. 14, 2013, now U.S. Pat. No. 9,025,080, which claims the benefit of U.S. Provisional Application No. 61/713,814, filed Oct. 15, 2012, and U.S. Provisional Application No. 61/860,168, filed Jul. 30, 2013, which are incorporated by reference in their entirety.

BACKGROUND

1. Technical Field

This disclosure relates to a camera system, and more specifically, to a heat sink for a camera system.

2. Description of the Related Art

Digital cameras are becoming faster and more powerful. As their capabilities improve, the processing power consumed to enable the faster speeds and greater resolution of modern digital cameras has increased significantly. When a digital camera is used over a long period of time, such as while capturing a video, the temperature of the electronics increases as a portion of the electrical energy is converted to thermal energy by resistive heating. In order to prevent damage to the electronics caused by high temperatures, it is beneficial to dissipate heat from the electronics. However, existing camera systems do not provide an efficient mechanism for heat dissipation. Furthermore, if the camera is placed inside of a closed protective case or waterproof housing, the housing may insulate the camera and restrict heat dissipation, thus increasing the likelihood of overheating.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Configuration Overview

A camera system includes a camera and a camera housing structured to at least partially enclose the camera. The camera comprises a camera body having a camera lens structured on a front surface of the camera body and electronics (e.g., imaging electronics, power electronics, etc.) internal to the camera body for capturing images via the camera lens and/or performing other functions. The camera further comprises an internal heat sink thermally coupled to the electronics for dissipating heat produced by the electronics. A lens ring thermally coupled to the internal heat sink is positioned around the lens of the camera on the front surface of the camera body. The lens ring transfers the heat produced by the electronics from the internal heat sink to an exterior of the camera body.

The camera housing includes an enclosure comprising a first material. A lens window of the camera housing is structured to substantially cover the camera lens of the camera when the camera is enclosed within the enclosure. The camera housing further includes a thermal conductor comprising a second material having a thermal conductivity equal to or higher than a thermal conductivity of the first material. The thermal conductor has an interior portion extending into an interior of the enclosure, the interior portion making contact with the lens ring of the camera when the camera is enclosed in the enclosure and providing a thermal conduction path away from the lens ring of the camera. The thermal conductor further includes an exterior portion having a surface outside the enclosure and forming at least a partial loop around the lens window of the camera housing. The thermal conductor is configured to transfer heat from the interior portion extending into the interior of the enclosure to the exterior portion having the surface outside the enclosure.

Example Camera System Configuration

Figure 1A:
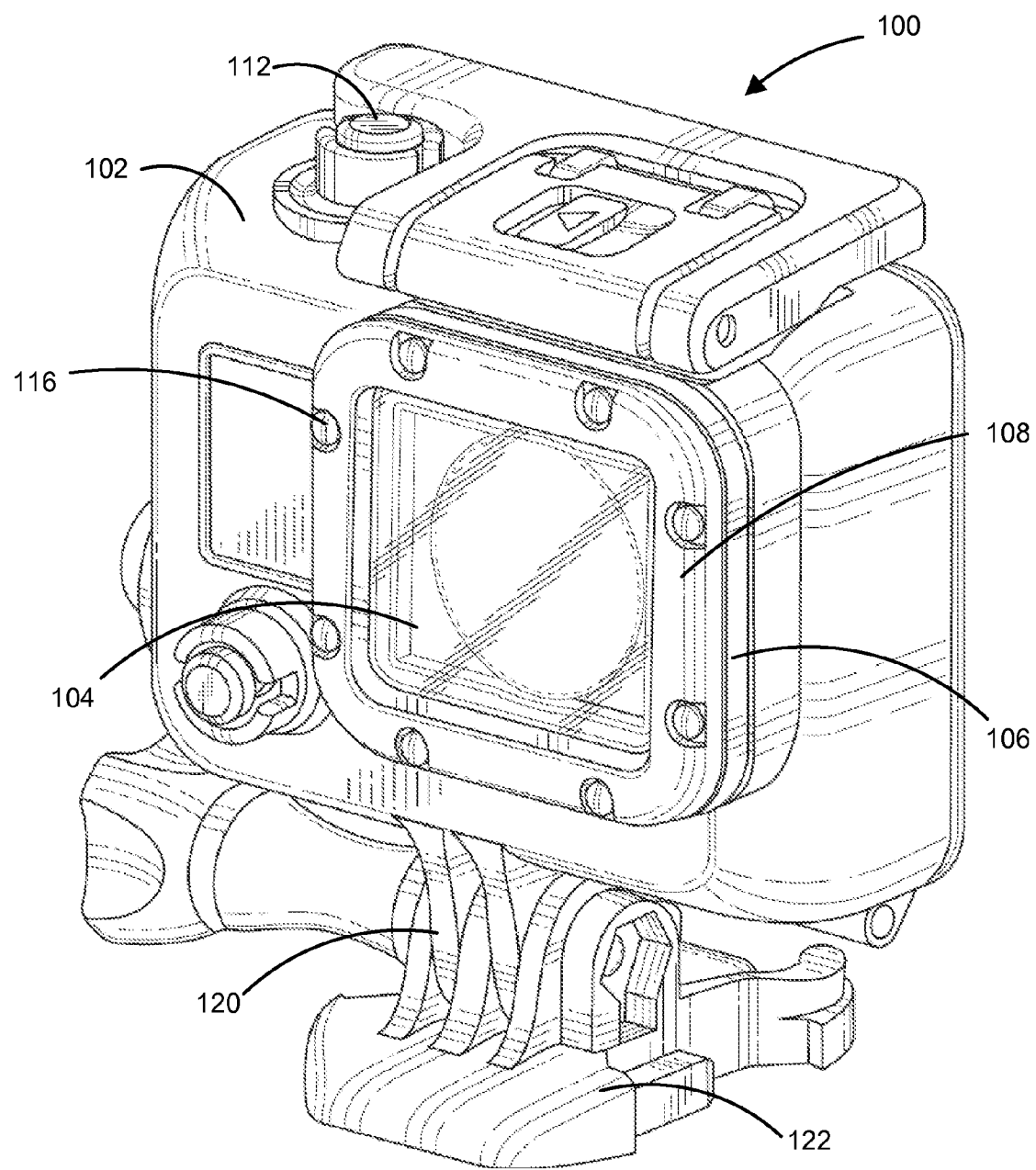
FIG. 1A illustrates a perspective view of a camera system, according to one embodiment.
Figure 1B:
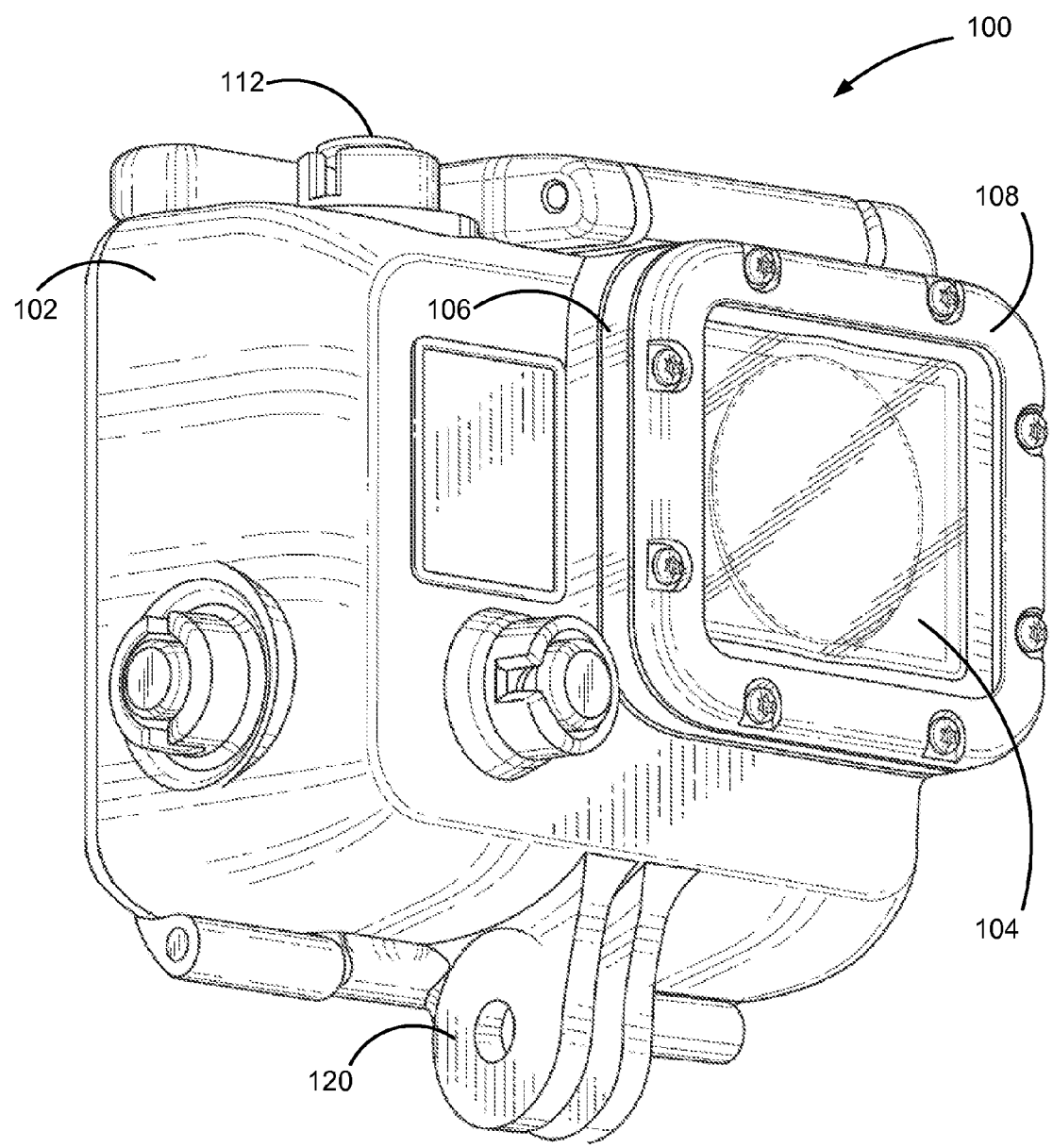
FIG. 1B illustrates an alternative perspective view of a camera system, according to one embodiment.

A camera system includes a camera and a camera housing for enclosing the camera. FIGS. 1A-B illustrate various views of the camera system in accordance with one embodiment. The camera system includes, among other components, a camera housing 100. In one embodiment, a first housing portion 102 includes a front face with five sides (i.e. a top side, bottom side, left side, right side, and front side) structured to form a cavity that receives a camera (e.g. a still camera or video camera).

In one embodiment, the camera housing 100 has a small form factor (e.g., a height of approximately 4 to 6 centimeters, a width of approximately 5 to 7 centimeters, and a depth of approximately 2 to 4 centimeters), and is lightweight (e.g., approximately 50 to 150 grams). The camera housing 100 can be rigid (or substantially rigid) (e.g., plastic, metal, fiberglass, etc.) or pliable (or substantially pliable) (e.g., leather, vinyl, neoprene, etc.). In one embodiment, the camera housing 100 may be appropriately configured for use in various elements. For example, the camera housing 100 may be a waterproof enclosure that protects a camera from water when used, for example, while surfing or scuba diving.

Portions of the camera housing 100 may include exposed areas to allow a user to manipulate buttons on the camera that are associated with the camera functionality. Alternatively, such areas may be covered with a pliable material to allow the user to manipulate the buttons through the camera housing 100. For example, in one embodiment the top face of the camera housing 100 includes an outer shutter button 112 structured so that a shutter button of the camera is substantially aligned with the outer shutter button when the camera is secured within the camera housing 100. The shutter button of the camera is operationally coupled to the outer shutter button 112 so that pressing the outer shutter button 112 allows the user to operate the camera shutter button. In one embodiment, the front face of the camera housing 100 includes a lens window 104 structured so that a lens of the camera is substantially aligned with the lens windows 104 when the camera is secured within the camera housing 100. The lens window 104 can be adapted for use with a conventional lens, a wide angle lens, a flat lens, or any other specialized camera lens. In this embodiment, the lens window 104 comprises a waterproof seal so as to maintain the waterproof aspect of the housing 100.

In one embodiment, the camera housing 100 includes one or more securing structures 120 for securing the camera housing 100 to one of a variety of mounting devices. For example, FIG. 1A illustrates the camera housing secured to a clip-style mount 122. In other embodiments, the camera housing 100 can be secured to a different type of mounting structure.

The described housing 100 may also be adapted for a wider range of devices of varying shapes, sizes and dimensions besides cameras. For example, an expansion module may be attached to housing 100 to add expanded features to electronic devices such as cell phones, music players, PDAs, GPS units, or other portable electronic devices.

In one embodiment, a thermal conductor 106 is configured to at least partially surround the lens window 104. The thermal conductor 106 comprises a material with a thermal conductivity equal to or higher than the thermal conductivity of the housing 100, such as copper or aluminum. The thermal conductor 106 extends into an interior of the first housing portion 102 and makes contact with a thermally conductive lens ring positioned around the lens of the camera. When the thermal conductor 106 is in contact with the lens ring on the camera, conductive heat transfer may occur between the thermal conductor 106 and the lens ring of the camera, as will be illustrated in FIGS. 6-9 discussed below.

In one embodiment, the thermal conductor 106 is configured to have a substantially rectangular cross-section, as illustrated for example in FIG. 1A, and may include rounded corners. Alternatively, the thermal conductor 106 may have a substantially square or substantially circular shape to conform to a shape of the lens window 104. In another embodiment, the thermal conductor 106 may feature additional structures configured to increase the surface area of the thermal conductor 106. For example, the thermal conductor 106 may comprise laterally-protruding fins, forming a spike or rib pattern at least partially surrounding the lens window 104.

An insulating plate 108 may be positioned to at least partially cover a front surface of the thermal conductor 106. The insulating plate 108 may comprise a thermally insulating material, such as plastic, and may be affixed to the thermal conductor 106 by one or more screws 116 or any other suitable fastening mechanism. In one embodiment, the insulating plate 108 may protect users of the camera from incidental contact with the thermal conductor 106, which may become hot during use. In one embodiment, the insulating plate 108 may have a larger diameter than the thermal conductor 106 such that the thermal conductor 106 is partially recessed under the insulating plate 108, further preventing incidental user contact with the conductor ring 106. Thus, in this embodiment, most of the heat is permitted to escape around the perimeter of the thermal conductor 106 instead of through the front face, thereby reducing the likelihood of direct contact from the user.

Figure 2:
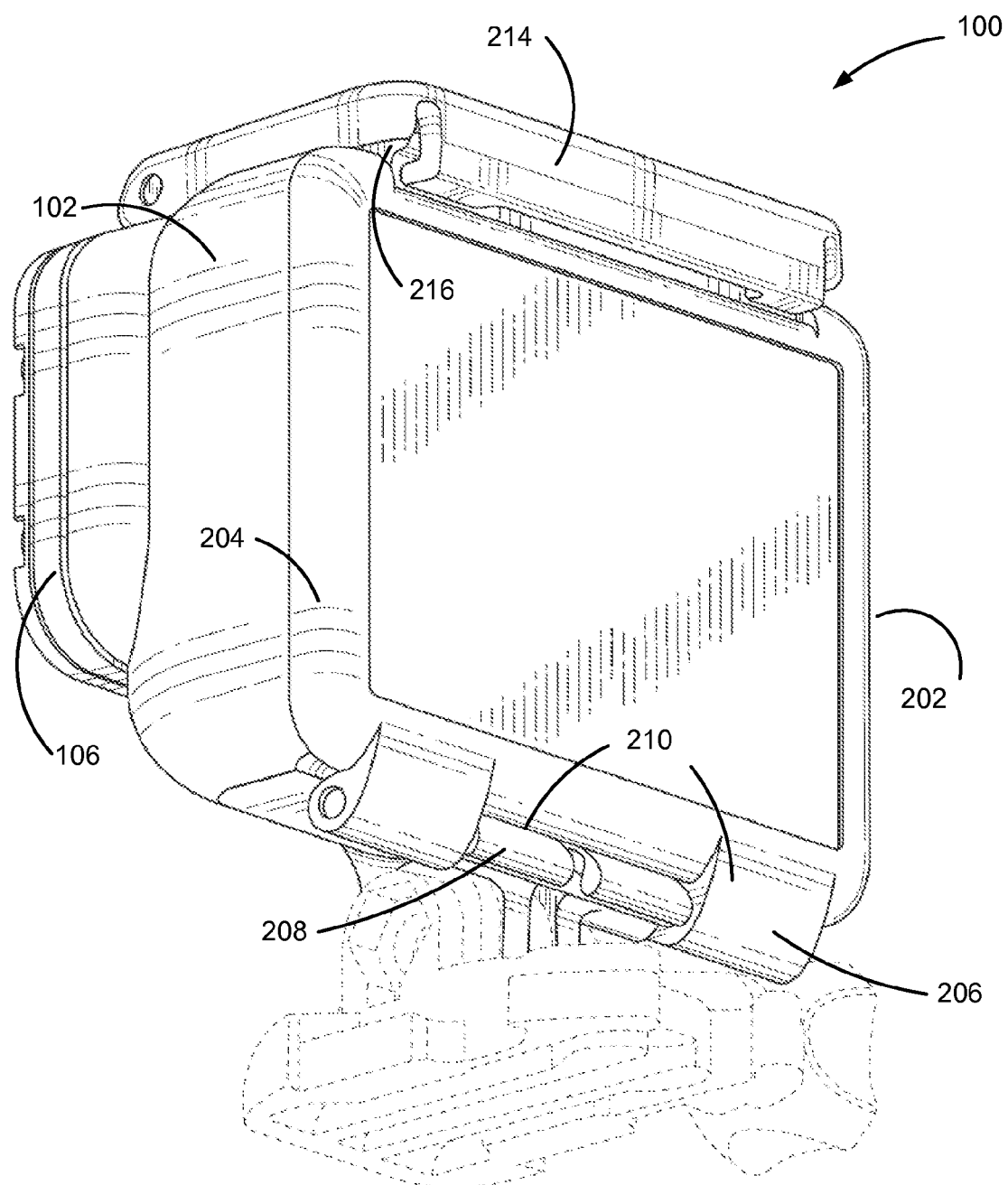
FIG. 2 illustrates a perspective view of a rear of the camera system, according to one embodiment.

FIG. 2 is a rear perspective view of camera housing 100, illustrating a second housing portion 202. The second housing portion 202 detachably couples with the first housing portion 102 opposite the front face of the first housing portion 102. The first housing portion 102 and second housing portion 202 are collectively structured to enclose a camera within the cavity when the second housing portion 202 is secured to the first housing portion 102 in a closed position.

In one embodiment, the second housing portion 202 comprises a door 204 that allows the camera to be removed from the housing 100. The door 204 pivots around a hinge 210 that allows the door 204 to be opened or shut. In one embodiment, a first fastening structure 214 located on the top face of the camera housing 100 detachably couples to a second fastening structure 216 on the door 204. The fastening structures 214, 216 secure the door 204 to the first portion 102 of the camera housing 100 in a closed position when coupled, as illustrated in FIG. 2. In one embodiment, the fastening structure 214 comprises a hook-shaped lateral bar and the fastening structure 216 comprises an L-shaped bar. The fastening structure 214 can pivot upwards to allow the door 204 to close and can then be pressed down around the fastening structure 216 to hold the door 204 in the closed position. In different embodiments, fastening structures for securing the door 204 can include, for example, a button assembly, a buckle assembly, a clip assembly, a hook and loop assembly, a magnet assembly, a ball and catch assembly, and an adhesive assembly, or any other type of securing mechanism.

In one alternative embodiment, the hinge 210 is instead located on the top face of the housing 100 and the fastening structures 214, 216 are instead located on the bottom face of the housing 100. Alternatively, the hinge 210 and fastening structures 214, 216 may be located on opposite side faces of the camera housing 100.

In one embodiment, the housing 100 includes a watertight seal so that the housing 100 is waterproof when the door 204 is shut. For example, in one embodiment, the door 204 includes a sealing structure positioned on interior edges of the door 204. The sealing structure provides a watertight seal between the first portion of the camera housing 102 and the door 204 when the first securing structure 214 on the top face of the camera housing 100 is coupled to the second securing structure 216 on the top edge of the door 204.

In one embodiment, an outer hinge structure 206 on the bottom edge of the second housing portion 202 detachably couples to an inner hinge structure 208 on the bottom edge of the first housing portion 102 to form the hinge 210. For example, in one embodiment, the outer hinge structure 206 comprises one or more hook-shaped protrusions structured to securely fasten to a rod-shaped member of the inner hinge structure 208. Other mechanisms for coupling the second housing portion 202 to the housing 100 may also be used in various alternative embodiments. In other embodiments, the second housing portion 202 may be permanently attached to the first housing portion 102.

Figure 3A:
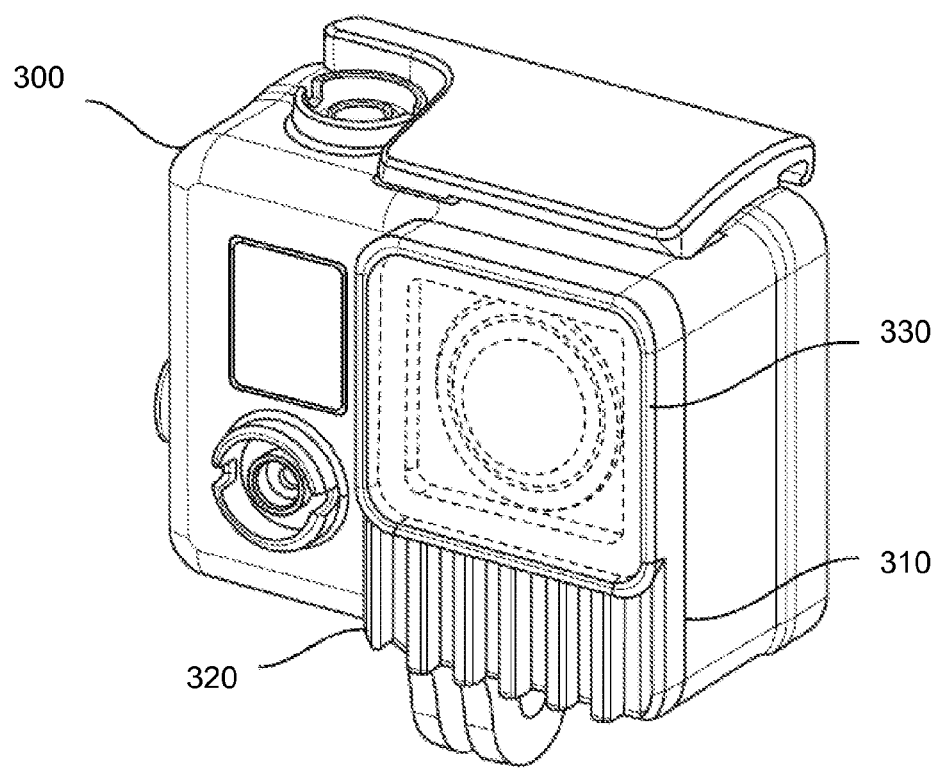
FIG. 3A illustrates an alternative perspective view of a camera housing, according to one embodiment.

FIG. 3A illustrates a perspective view of an alternative embodiment of the camera housing. The camera housing 300 of FIG. 3A shows the first housing portion with a thermally conductive portion 310 configured to allow for the transfer of heat from the camera to outside the housing. In the embodiment of FIG. 3A, the thermally conductive portion 310 includes fins 320 and a lens window 330. The lens window 330 can be configured to align with a camera lens when a camera is securely enclosed within the housing. The fins 320 protrude from the front face of the housing 300 and run from the bottom of the thermally conductive portion 310 to the lens ring 330. The fins 320 create wind resistance that causes greater heat dissipation from the fins 320. Thus, the fins 320 beneficially allow for more heat transferred from the camera to the lens ring 330 to be dissipated than is dissipated by a thermally conductive portion with a flat front face.

Figure 3B:
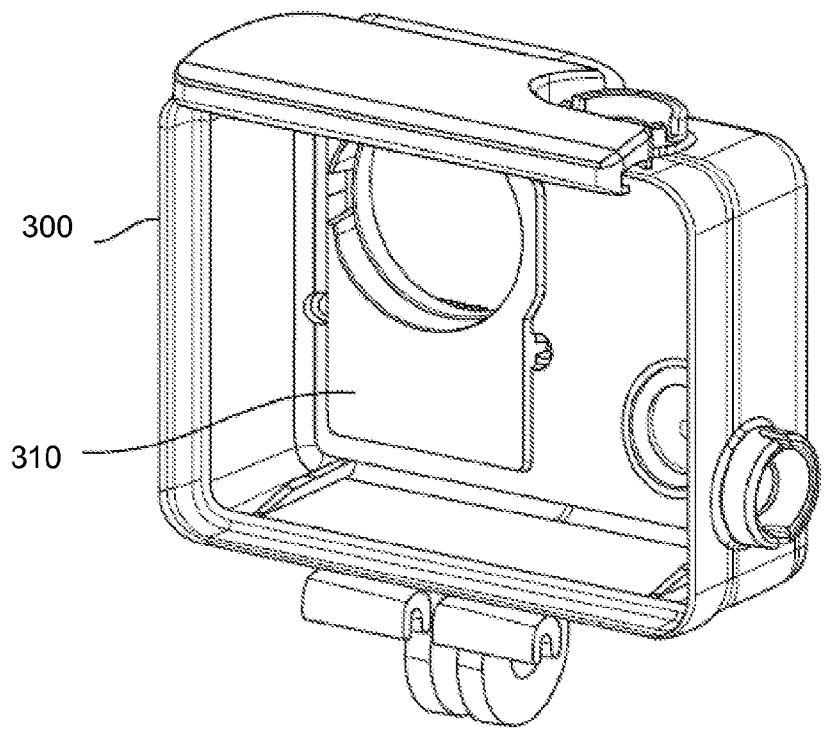
FIG. 3B illustrates a perspective view of the inside of a camera housing, according to one embodiment.

FIG. 3B illustrates a perspective view of the inside of a first portion of a camera housing and the thermally conductive portion 310, according to one embodiment. The thermally conductive portion 310 can be configured to align and thermally couple with a thermally conductive ring on the front face of a camera, allowing heat to be transferred from within the camera to the thermally conductive portion 310 of the housing.

Figure 4:
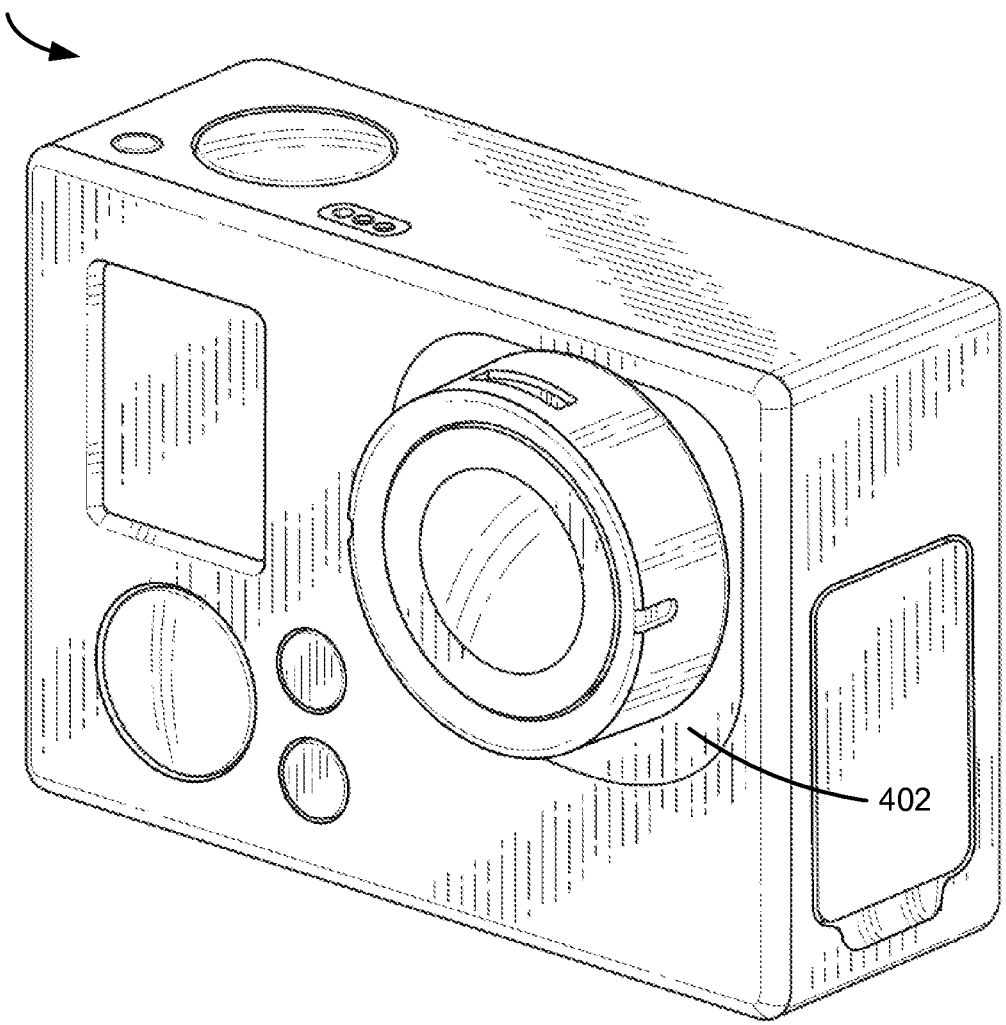
FIG. 4 illustrates a camera for use with the camera system, according to one embodiment.

FIG. 4 illustrates an example embodiment of a camera 400 for use with the camera system. The camera 400 is adapted to fit within the enclosure of the housing 100 or 300 discussed above. As illustrated, the camera 400 includes a lens ring 402 around a lens of the camera 400. The lens rings 402 comprises a conductive material thermally coupled to internal electronics of the camera 400 and adapted to dissipate heat produced by the internal electronics. When placed within the housing 100, the lens ring 402 makes physical contact with an interior portion of the thermal conductor 106 of the camera housing 100, thereby providing a path for heat to dissipate externally to the housing 100.

In one embodiment, as illustrated in FIGS. 1A, 1B, and 4, the thermal conductor 106 is fixed to the housing 100 and the lens ring 402 is fixed to the camera 400. In other embodiments, one or both of the thermal conductor 106 and the lens ring 402 are removable from the housing 100 and the camera 400, respectively. Various embodiments of a removable lens ring and thermal conductor are illustrated in FIGS. 5A-C and described in further detail below.

Figure 5A:
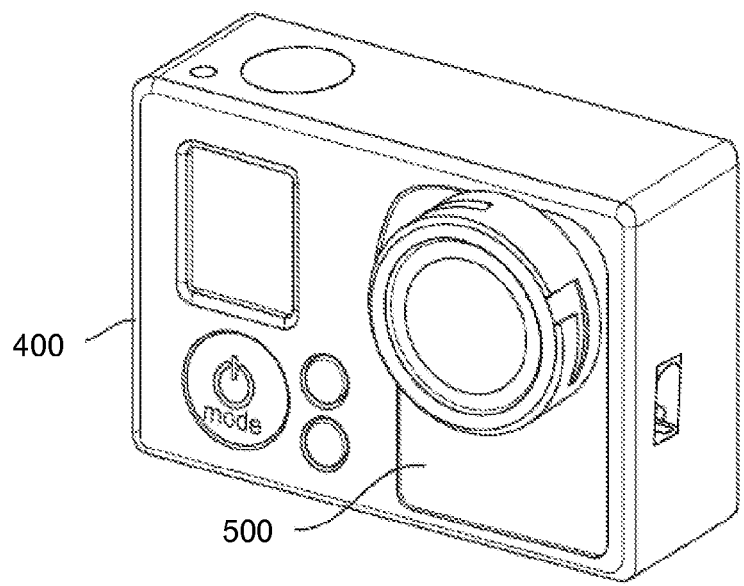
FIG. 5A illustrates a camera with a removable heat sink, according to one embodiment.
Figure 5B:
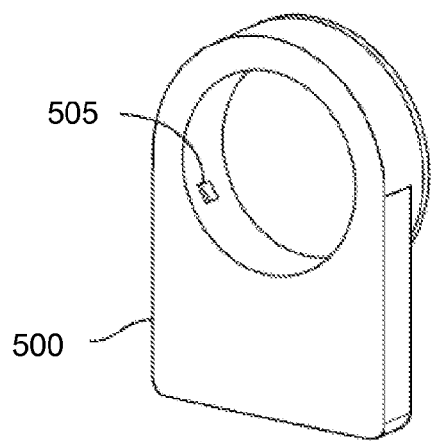
FIG. 5B illustrates a removable heat sink, according to one embodiment.
Figure 5C:
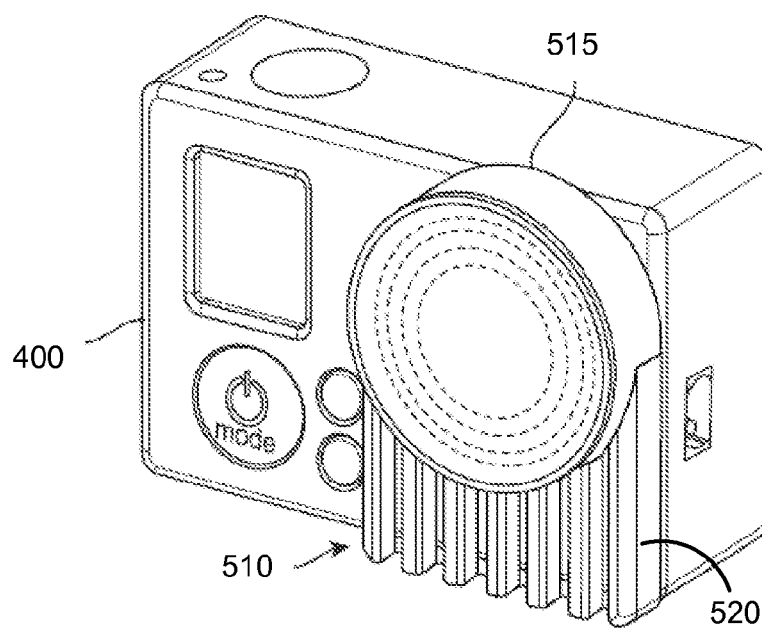
FIG. 5C illustrates a camera with a removable lens cover heat sink, according to one embodiment.

Referring to FIG. 5A, illustrated is one embodiment of a camera 400 with a removable lens ring 500. In the embodiment of FIG. 5A, the lens ring 500 is coupled to the camera 400. The lens ring 500 is made of a thermally conductive material. As described above, the lens ring 500 couples to internal heat-producing camera components, allowing heat generated within the camera 500 to be transferred via the lens ring 500 to the exterior of the camera 400.

It should be noted that although the lens ring 500 in the embodiment of FIG. 5A encircles the lens of the camera 400 and partially extends down the face of the camera 400. In other embodiments, a thermally conductive surface thermally coupled to internal electronics of the camera 400 may not encircle the lens, and may instead couple to other portions of the front face of the camera 400 or any other camera faces, or the entire front camera face. It should also be noted that portions of the lens ring 500 can be covered by a thermally insulating material, protecting users of the camera 400 from incidental contact with the lens ring 500.

In various embodiments, to couple to the camera 400, the removable lens ring 500 is inserted within a reciprocal cavity within the front face of the camera 400. In some embodiments, some portions of the lens ring 500, when inserted within the reciprocal cavity, form a substantially smooth surface with the front face of the camera 400, while other portions of the lens ring 500 protrude from the front surface of the camera 400 (for instance, the portions encircling and immediately adjacent to the lens).

In a first camera operating mode (such as a low power mode or a low resource-intensive mode), a relatively non-thermally conductive component (such as a plastic lens ring and front camera face) can be inserted within the reciprocal cavity. In the first operating mode, less heat dissipation may be required for operation, and use of the lens ring 500 may not be required. In a second camera operating mode (such as a high power mode or a high resource-intensive mode), the non-thermally conductive component can be removed from the reciprocal cavity, exposing the thermally conductive components within the camera 400, and the lens ring 500 can be inserted into the reciprocal cavity. In the second operating mode, greater heat dissipation may be required for operation, and use of the lens ring 500 may be beneficial. Accordingly, use of the removable lens ring 500 can enable camera operation modes that generate high amounts of heat.

FIG. 5B illustrates a removable lens ring 500, according to one embodiment. In the embodiment of FIG. 5B, the lens ring 500 couples to the camera 400 via a bayonet mount. The lens ring 500 includes at least one bayonet mount slot 505 configured to couple to one or more lens ring pins. The back of the lens ring 500 is substantially flat, allowing the lens ring 500 to maximize surface area contact with a flat thermally conductive component within the camera 400. The removable lens ring 500 also includes a hole configured to encircle a camera lens. Such a configuration allows the camera 400 to capture light via the camera lens normally, without the removable heat sink 500 blocking the light. In some embodiments, the removable heat sink is shaped differently than in the embodiment of FIG. 5B, and/or couples to the camera via other mechanisms.

In one embodiment, a removable lens cover can couple to the front of the camera 400 such that the lens cover is thermally coupled to the lens ring 402 or the removable lens ring 500. The removable lens cover is configured to further increase heat dissipation from the heat-generating components of the camera 400. For example, the removable lens cover can be attached to the camera 400 during high power or high resource-intensive operating modes for dissipating a greater amount of heat from the camera 400 than that dissipated by the lens ring 402 or 500 alone. FIG. 5C illustrates a camera 400 with a removable lens cover 510, according to one embodiment. The removable lens cover 510 is made of a thermally conductive material, and couples to the front of the camera 400. In some embodiments, the lens cover 510 couples to the camera when the removable lens ring 500 is coupled to the camera. In other words, the removable lens ring 500 can be coupled to the camera 400 within a reciprocal cavity, and the removable lens cover 510 can couple to the camera 400 over the lens ring 500. In other embodiments, the lens cover 510 thermally couples to the fixed lens ring 402 of the camera 400. The lens cover 510 can be configured to make thermal contact with the lens ring 402 or 500, such that heat generated within the camera 400 can be thermally transferred to the lens ring, from the lens ring to the lens cover 510, and from the lens cover 510 to the exterior of the camera 400. In some embodiments, the lens cover 510 can couple to the camera 400 when the camera 400 is not coupled to the removable lens ring 500. In such embodiments, the lens cover 510 makes thermal contact with thermally conductive points exposed on the camera surface, allowing heat to transfer from within the camera 400 to the lens cover 510.

The removable lens cover 510 of the embodiment of FIG. 5C includes a lens ring 515 and a plurality of fins 520 protruding from the front face of the lens cover and running from the bottom of the lens cover 510 up to the lens ring 515. As noted above, the fins 520 create wind resistance that can improve the dissipation of heat transferred to the removable lens cover 510. In other embodiments, the lens cover 510 includes fewer or more fins that may be arranged in differing configurations than that illustrated in FIG. 5C.

Heat Sink for Camera System

Figure 6:
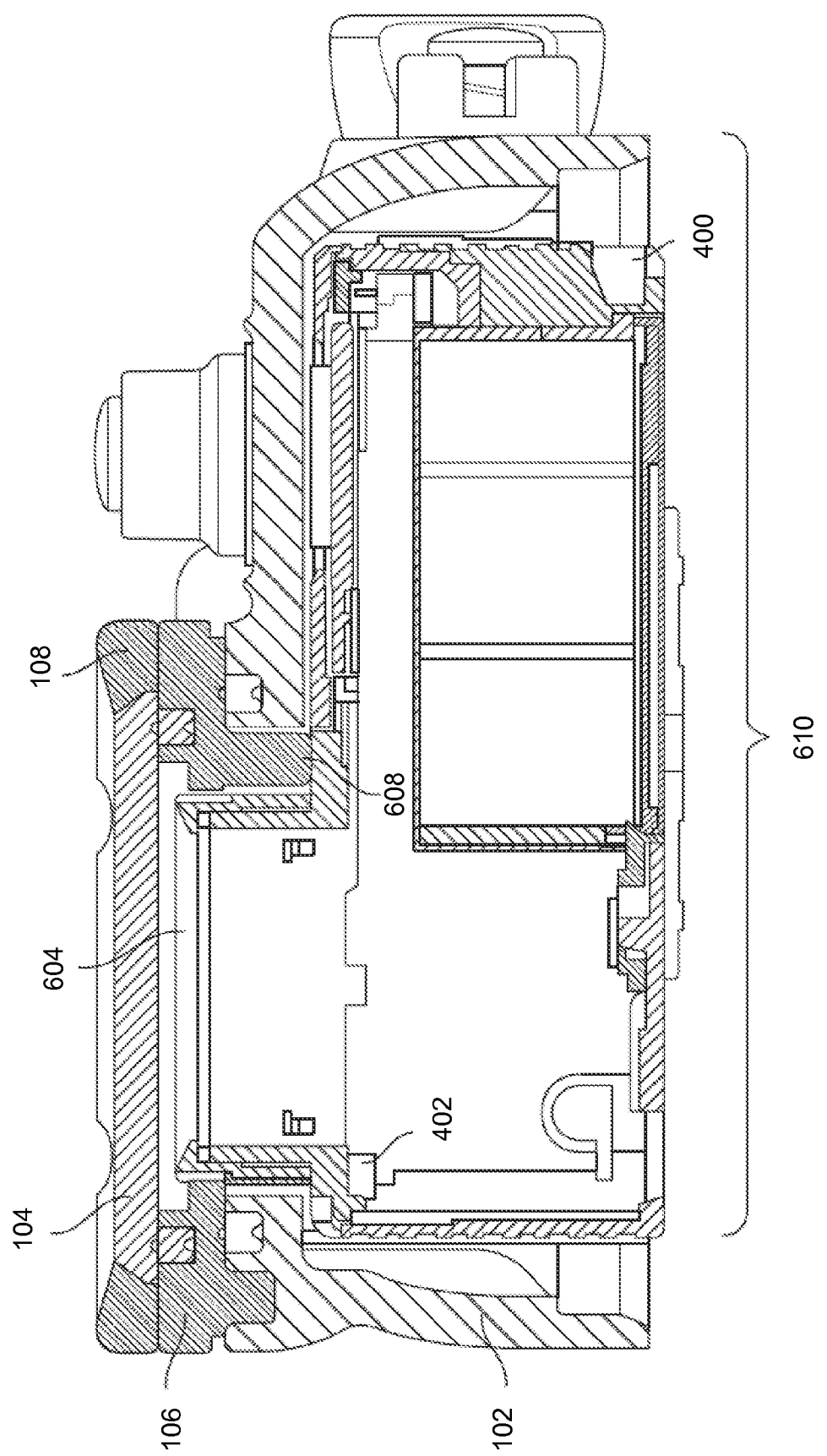
FIG. 6 is a top-down cutaway view of a camera within a camera housing, according to one embodiment.
Figure 7:
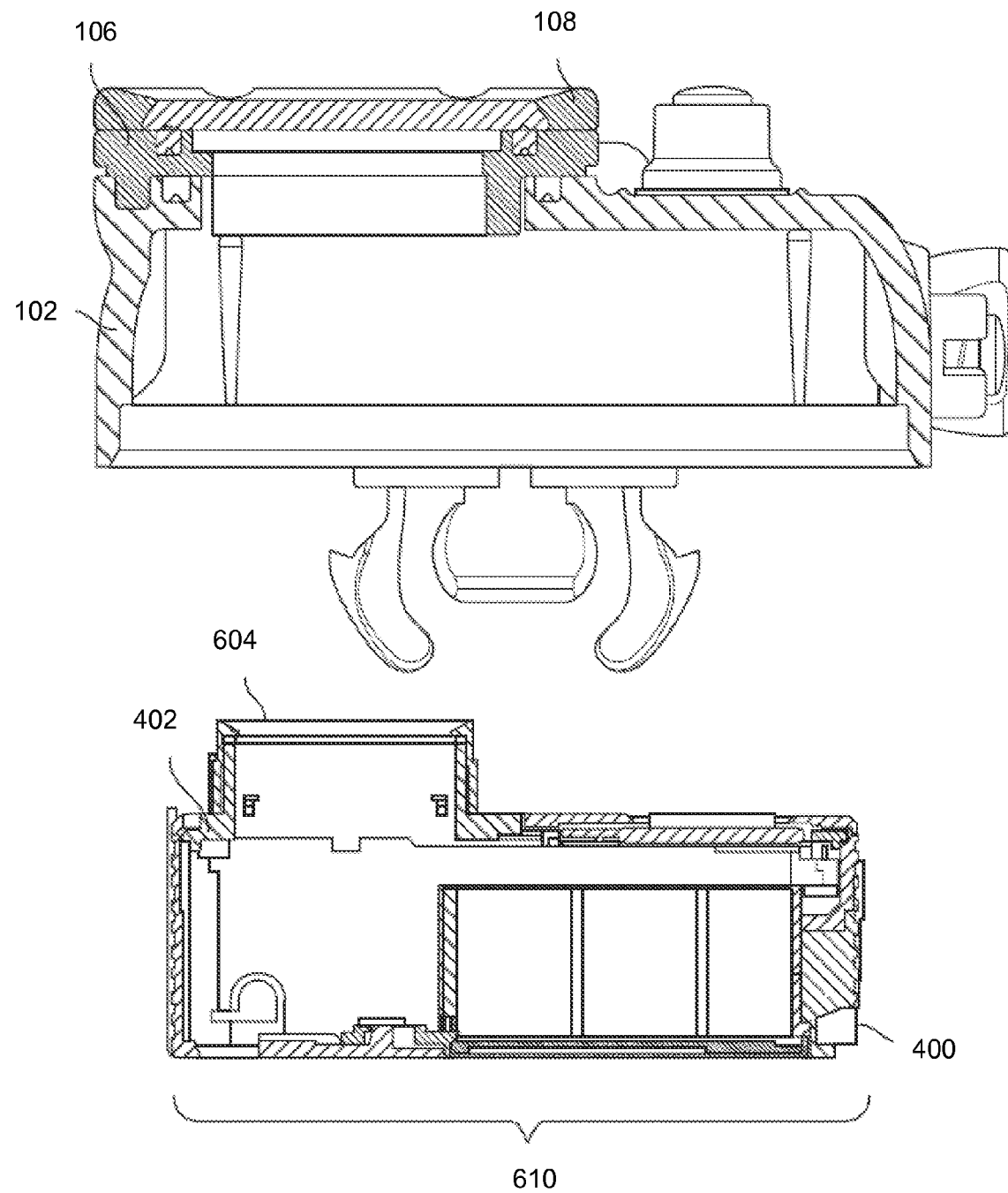
FIG. 7 is a top-down cutaway view of a camera removed from a camera housing, according to one embodiment.

FIG. 6 is a top-down cutaway view of the camera system including the camera 400 and the first housing portion 102. FIG. 7 illustrates a similar viewing perspective with the camera 400 removed from the first housing portion 102. Camera 400 comprises a camera body 610 and a lens 604 located on a front surface of the body 610. The camera 400 fits inside a cavity of the first housing portion 102 such that the lens 604 of the camera 400 is aligned with the lens window 104 of the housing 100. When placed inside the camera housing 100, the camera 400 is enclosed and protected by the camera housing 100.

The camera 400 comprises electronics that capture digital images and/or video via the camera lens 604. During operation of the camera, a portion of the electrical energy used by the electronics is converted to heat due to resistive components of the electronics. This heat can cause performance problems or damage to the electronics. Furthermore, if the housing 100 is waterproof, the housing 100 may insulate the camera 400 and prevent dissipation of the heat. It is therefore desirable to dissipate the heat away from the electronics by thermally coupling a heat sink to the heat-producing electronics of the camera.

Generally, the camera system heat sink increases an effective surface area from which heat is transferred away from the electronics. For example, in one embodiment, a heat sink for the camera system comprises a conductive structure (e.g., a metal) thermally coupled to the electronics within the camera. The internal heat sink structure may be coupled to a thermally conductive lens ring 402 or a removable lens ring 500 positioned around an external region of the camera lens 604, thus providing a conduction path to the surface of the camera 400. When enclosed in the housing 100, the lens ring 402 of the camera 400 makes contact with an interior portion of a thermal conductor 106 on the housing 100 (e.g., at a contact point 608). During operation of the camera, heat produced by the electronics is therefore conductively transferred to the thermal conductor 106 of the housing 100 via the lens ring 402 of the camera 400. The heat may then be dissipated to the surrounding environment (e.g., air or water) by conduction and/or convection via an external portion of the thermal conductor 106 that extends to an exterior of the camera housing 100. Thus, by structuring the camera housing 100 to provide a conduction path from the camera to an exterior of the housing, the camera 400 can achieve significantly improved temperature regulation.

Due to process variation during manufacturing of the camera 400 and the housing 100, the relative fit between the camera 400 and housing 100 may vary somewhat between different instances of the camera 400 and the housing 100. If the housing 100 and camera 400 are not precisely matched, an air gap of variable thickness may exist at interface 608, and the lens ring 402 of the camera 400 may not firmly contact the thermal conductor 106 of the housing 100. Any imprecision may prevent the camera from fitting snugly inside the housing 100 (e.g., the camera might rattle), which may result in unsteady video, blurry images, or physical damage to the camera. In addition, the low thermal conductivity of air may significantly decrease heat flux from the chip and therefore decrease the effectiveness of the heat sink. These potential disadvantages can be overcome in one embodiment by including a compressible structure between the camera 400 and door 204 of the camera housing 100. For example, the compressible material may be adhered to an interior of the door 204 and may be configured as a ring or in one or more rectangular strips. When the camera 400 is enclosed in the housing 100, the compressible material pushes the camera 400 to the front of the housing 100 to ensure contact between the lens ring 402 and the thermal conductor 106. The compressible nature of the material allows it to compensate for variations in the size and structure of the camera housing 100 and camera 400 and ensure that sufficient contact is made between the lens ring 402 and the thermal conductor 106.

Figure 8:
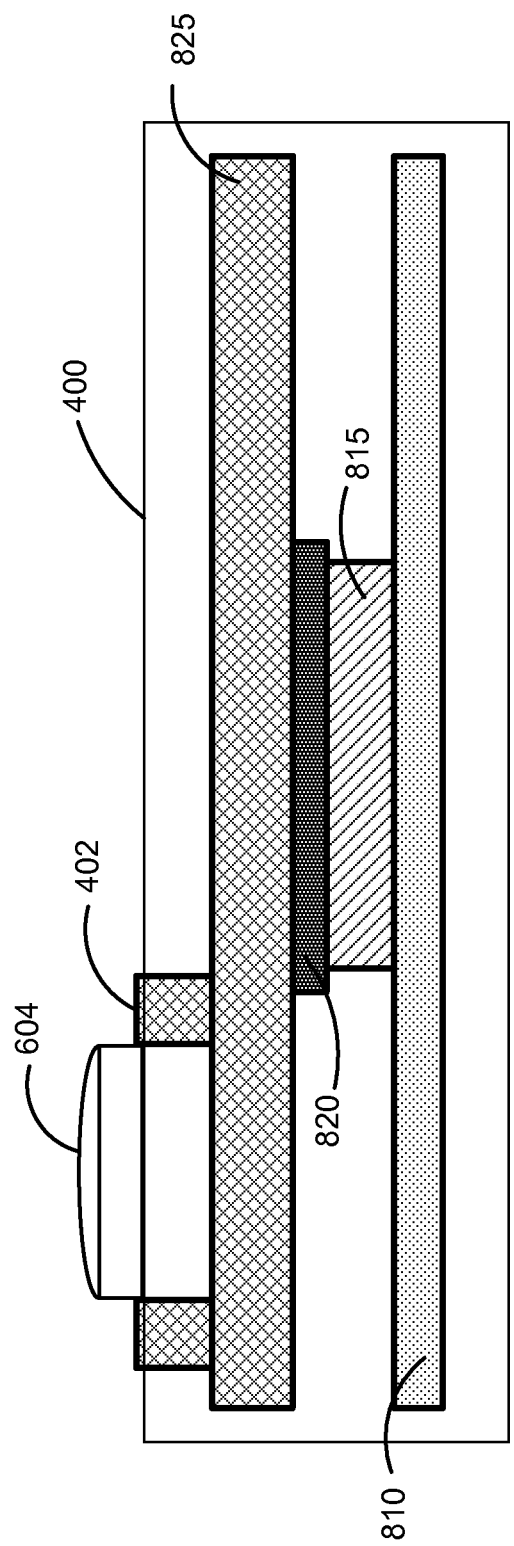
FIG. 8 is a schematic of a camera heat sink internal to a camera, according to one embodiment.

FIG. 8 illustrates an embodiment of the internal components of a camera 400. Electronics of the camera 400, including, for example, a chip 815, are mounted on a printed circuit board (PCB) 810 that is secured internally to the camera 400. The chip 815 is thermally coupled to a conducting plate 825. In one embodiment, the conducting plate 825 comprises a material having a high thermal conductivity. For example, the conducting plate 825 may comprise copper, aluminum, or composite materials such as E-material or alloys of aluminum or copper.

In one embodiment, thermal paste 820 may be used to improve the efficiency of heat transfer between the chip 815 and the conducting plate 825. Thermal paste 820 may be any material having a high thermal conductivity that is capable of preventing air gaps between the chip 815 and the conducting plate 825, such as a phase change metal alloy or silicone, metal, or ceramic thermal compounds. The thermal paste 820 may further ensure that the conducting plate 825 remains coupled to the chip 815 when the camera 400 is subjected to shock or vibration, for example when used during physical activity. Other materials suitable for ensuring thermal coupling between the conducting plate 825 and the chip 815 may be used in place of thermal paste 820.

The conducting plate 825 is also thermally coupled to a thermally conductive surface on the front face of the camera 400, such as the lens ring 402. In one embodiment, the lens ring 402 is positioned at a base of the camera lens 604. The lens ring 402 is illustrated as protruding slightly from the front face of the camera 400 in FIG. 8. However, in other alternative embodiments, lens ring 402 may be substantially flush with the front face of the camera 400, or may be recessed within the camera 400. In another alternative embodiment, lens ring 402 may protrude further from the camera 400 (e.g., to be substantially the same length as the lens 604). As illustrated in FIG. 8, the thermal paste 820, conducting plate 825, and lens ring 402 form a conductive path from the chip 815 to the front face of the camera 400.

Figure 9:
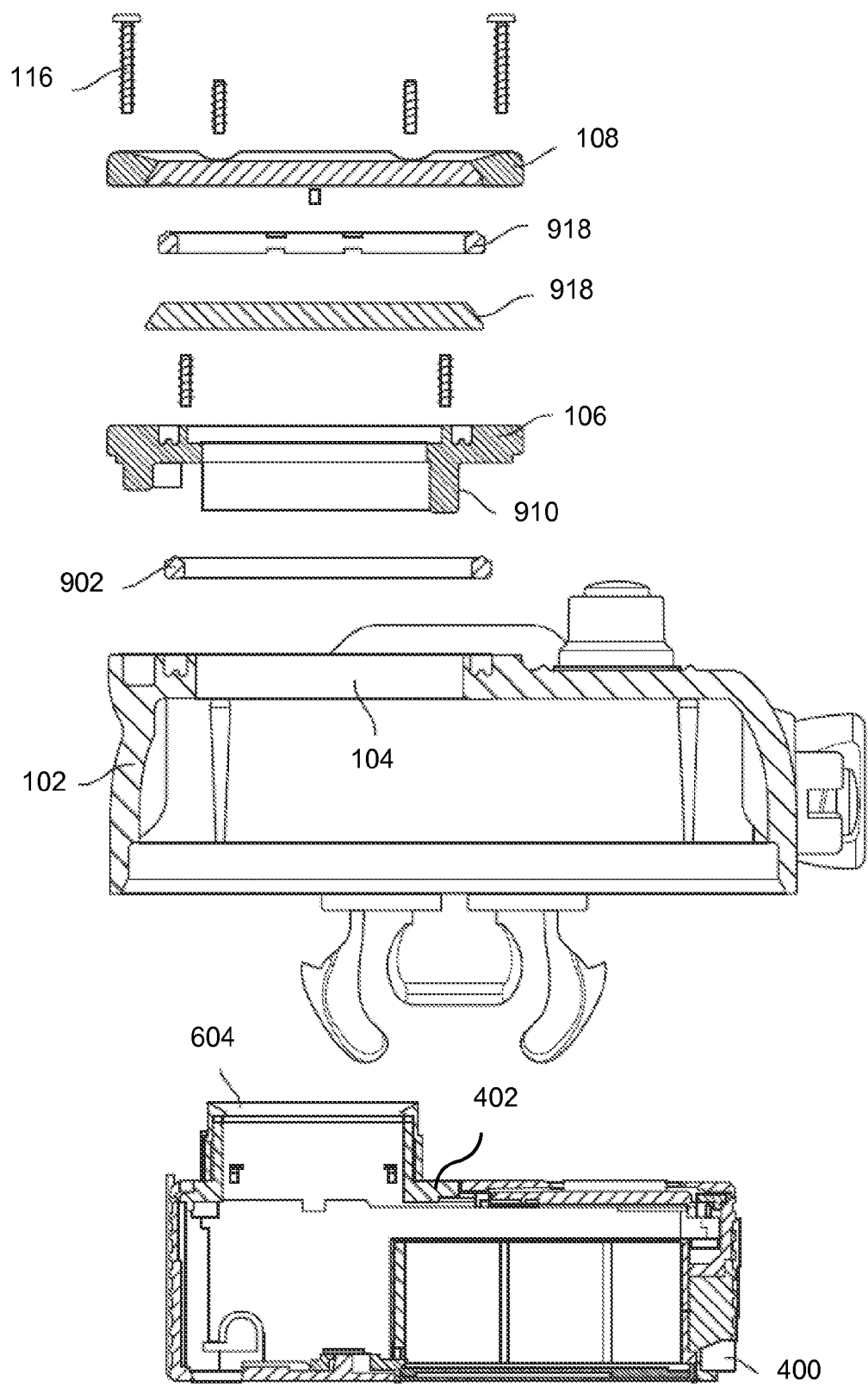
FIG. 9 is an exploded view of a camera system, according to one embodiment.

FIG. 9 is an exploded view of the camera system, illustrating the various components of the camera heat sink in relation to the camera system. The camera 400 fits within the first camera housing portion 102 such that the lens 604 is aligned with the lens window 104. The thermal conductor 106 couples to the first camera housing portion 102 by connector 902. In one embodiment, connector 902 forms a watertight seal between the thermal conductor 106 and the first housing portion 102. When attached to the housing, the interior portion 910 of the thermal conductor 106 extends through the lens window 104 into the interior region of front housing portion 102. The interior portion 910 makes contact with the lens ring 402 when the camera 400 is enclosed in the housing 100. The insulating plate 108 is affixed to the front surface of the thermal conductor 106 by screws 116. In one embodiment, various standoffs 918 may be positioned in between the thermal conductor 106 and the insulating plate 108. The insulating plate 108 generally has a lower conduction coefficient than the thermal conductor 106, and can therefore act to prevent a user of the camera from incidental contact with the thermal conductor 106.

When assembled, the camera system as illustrated in FIG. 9 comprises the heat sink thermally coupled to the electronics of the camera and configured to extend to the exterior of the camera. The thermal conductor 106 of the camera housing 100 is configured to transfer the heat from the exterior of the camera 400 to the exterior of the camera housing 100. As a result, the heat sink, including the conducting plate 825, the lens ring 402, and the thermal conductor 106, forms a thermal conduction path from the chip 815 to the external environment. By increasing the effective heat transfer surface area of the chip 815, the heat sink as described dissipates heat produced by the chip 815 to the external environment, thereby cooling the chip 815 and preventing damage to the electronics.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises", "comprising", "includes", "including", "has", "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a camera expansion module as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A camera, comprising:
a camera body having a camera lens structured on a front surface of the camera body;
electronics internal to the camera body, the electronics for capturing images via the camera lens; and
an internal heat sink thermally coupled to the electronics for dissipating heat produced by the electronics; and
a thermally conductive lens ring positioned around the camera lens of the camera on the front surface of the camera body and partially covered by a thermally insulating material, the lens ring thermally coupled to the heat sink internal to the camera body to transfer the heat produced by the electronics from the internal heat sink to an exterior of the camera body.

2. The camera of claim 1, wherein the lens ring forms at least a partial ring around the camera lens.

3. The camera of claim 1, further comprising a lens cover removably coupled to the camera body and making contact with the lens ring when coupled to the camera body, wherein the heat produced by the electronics is transferred from the lens ring to the lens cover.

4. The camera of claim 3, wherein the lens cover comprises a plurality of fins structured to provide a surface area for conducting the heat to the exterior of the camera body.

5. The camera of claim 1, wherein the camera body comprises a first material, and wherein the lens ring comprises a second material having a higher thermal conductivity than the first material.

6. A camera, comprising:
a camera body having a camera lens structured on a front surface of the camera body;
electronics internal to the camera body, the electronics for capturing images via the camera lens;
an internal heat sink thermally coupled to the electronics for dissipating heat produced by the electronics; and
a thermally conductive lens ring positioned around the camera lens of the camera on the front surface of the camera and substantially flush with the front surface of the camera body, the lens ring thermally coupled to the heat sink internal to the camera body to transfer the heat produced by the electronics from the internal heat sink to an exterior of the camera body.

7. The camera of claim 6, wherein the lens ring forms at least a partial ring around the lens.

8. The camera of claim 6, further comprising a lens cover removably coupled to the camera body and making contact with the lens ring when coupled to the camera body, wherein the heat produced by the electronics is transferred from the lens ring to the lens cover.

9. The camera of claim 8, wherein the lens cover comprises a plurality of fins structured to provide a surface area for conducting the heat to the exterior of the camera body.

10. The camera of claim 6, wherein the camera body comprises a first material, and wherein the lens ring comprises a second material having a higher thermal conductivity than the first material.

11. A camera, comprising:
a camera body comprising a first material, the camera body having a camera lens structured on a front surface of the camera body;
electronics internal to the camera body, the electronics for capturing images via the camera lens; and
a heat sink comprising a second material having a higher thermal conductivity than the first material, the heat sink thermally coupled to the electronics and comprising a thermally conductive surface positioned on the front surface of the camera body, the heat sink dissipating heat produced by the electronics to an exterior of the camera body.

12. The camera of claim 11, wherein the thermally conductive surface comprises a lens ring forming at least a partial ring around the camera lens.

13. The camera of claim 11, further comprising a thermally insulating material covering at least a portion of the thermally conductive surface.

14. The camera of claim 11, wherein the thermally conductive surface is substantially flush with the front surface of the camera body.

15. The camera of claim 11, wherein the thermally conductive surface is recessed beneath the front surface of the camera body.

16. The camera of claim 11, wherein the lens ring comprises a plurality of fins structured to provide a surface area for conducting the heat to the exterior of the camera body.

17. A camera, comprising:
a camera body having a camera lens structured on a front surface of the camera body;
electronics internal to the camera body, the electronics for capturing images via the camera lens;
a heat sink thermally coupled to the electronics and comprising a thermally conductive surface positioned on the front surface of the camera body, the heat sink dissipating heat produced by the electronics to an exterior of the camera body; and
a lens ring removably coupled to the camera body and making contact with the thermally conductive surface when coupled to the camera body, wherein the heat produced by the electronics is transferred from the thermally conductive surface to the lens ring.

18. The camera of claim 17, wherein the front surface of the camera body comprises a reciprocal cavity structured to receive the lens ring, and wherein the lens ring comprises a planar component substantially flush with the front surface of the camera body when the lens ring is coupled to the camera body within the reciprocal cavity.

19. The camera of claim 17, further comprising a lens cover removably coupled to the camera body and making contact with the lens ring when coupled to the camera body, wherein the heat produced by the electronics is transferred from the lens ring to the lens cover.

20. The camera of claim 19, wherein the lens ring comprises a plurality of fins structured to provide a surface area for conducting the heat to the exterior of the camera body.

* * * * *